United States Patent [19]

Yamashita et al.

[11] Patent Number: 5,287,196

[45] Date of Patent: Feb. 15, 1994

[54] METHOD AND APPARATUS FOR RECORDING VIDEO INFORMATION SIGNALS TO AVOID INTERFERENCE DURING AFTER-RECORDING

[75] Inventors: Keitaro Yamashita, Tokyo; Etsurou Sakamoto, Kanagawa, both of Japan

[73] Assignee: Sony Corporation, Tokyo, Japan

[21] Appl. No.: 741,078

[22] Filed: Aug. 6, 1991

[30] Foreign Application Priority Data

Aug. 8, 1990 [JP] Japan .............................. 2-209488
Aug. 10, 1990 [JP] Japan .............................. 2-212598

[51] Int. Cl.⁵ .............................................. H04N 9/89
[52] U.S. Cl. .................................. 358/320; 358/341; 358/343; 360/19.1
[58] Field of Search ............... 358/343, 341, 310, 335, 358/320, 327, 328; 360/19.1

[56] References Cited

U.S. PATENT DOCUMENTS

| | | | |
|---|---|---|---|
| 4,670,796 | 6/1987 | Kobayashi et al. | 358/310 |
| 4,910,605 | 3/1990 | Sasaki et al. | 358/310 |
| 5,012,352 | 4/1991 | Yoshimura et al. | 358/343 |

Primary Examiner—Jeffery Brier
Assistant Examiner—Robert Chevalier
Attorney, Agent, or Firm—William S. Frommer; Alvin Sinderbrand

[57] ABSTRACT

Video and information signals are recorded in slant tracks on a magnetic tape having a wrap angle of no more than about 180° by timebase converting at least the video signal which then is time division multiplexed with the information signal. The time division multiplexed signals are recorded sequentially in a length of track that is less than the wrap angle to form successive tracks.

54 Claims, 13 Drawing Sheets

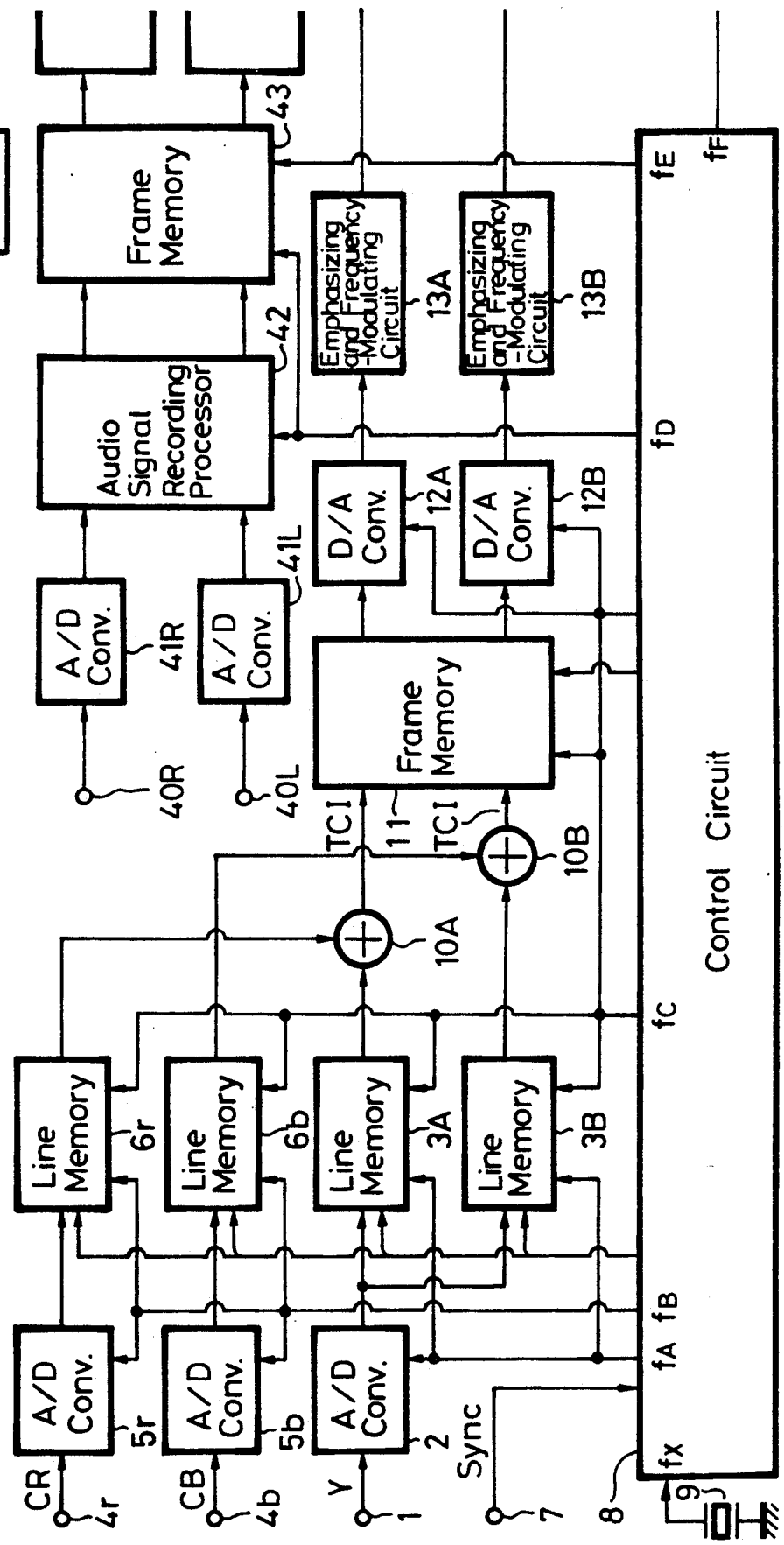

FIG.6A
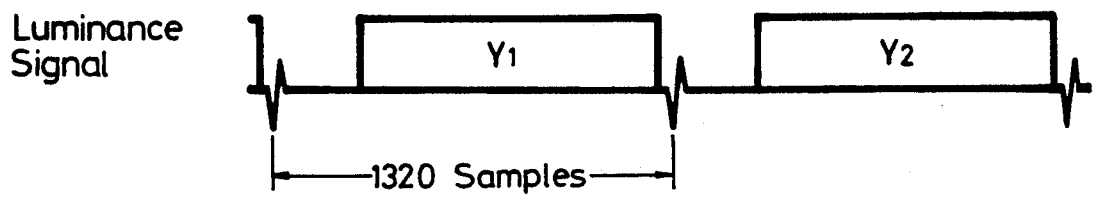
Luminance Signal
FIG.6B
Red Color Difference Signal R−Y
FIG.6C
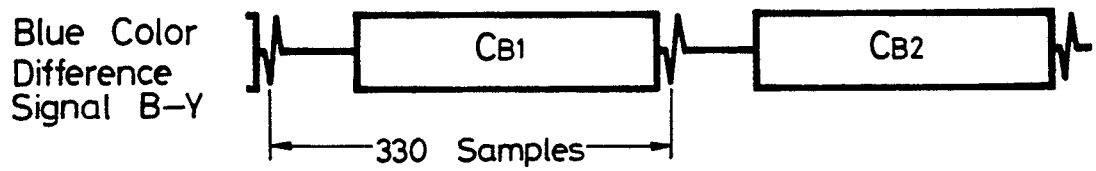
Blue Color Difference Signal B−Y
FIG.6D
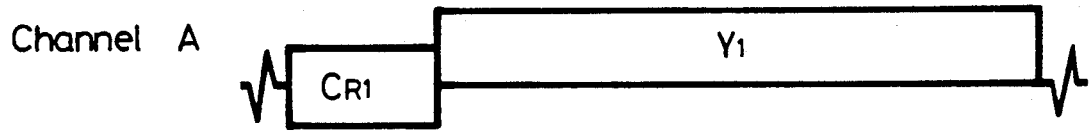
Channel A
FIG.6E
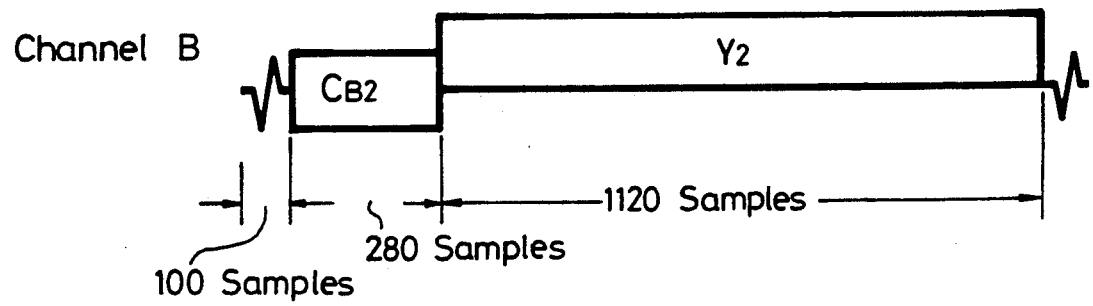
Channel B

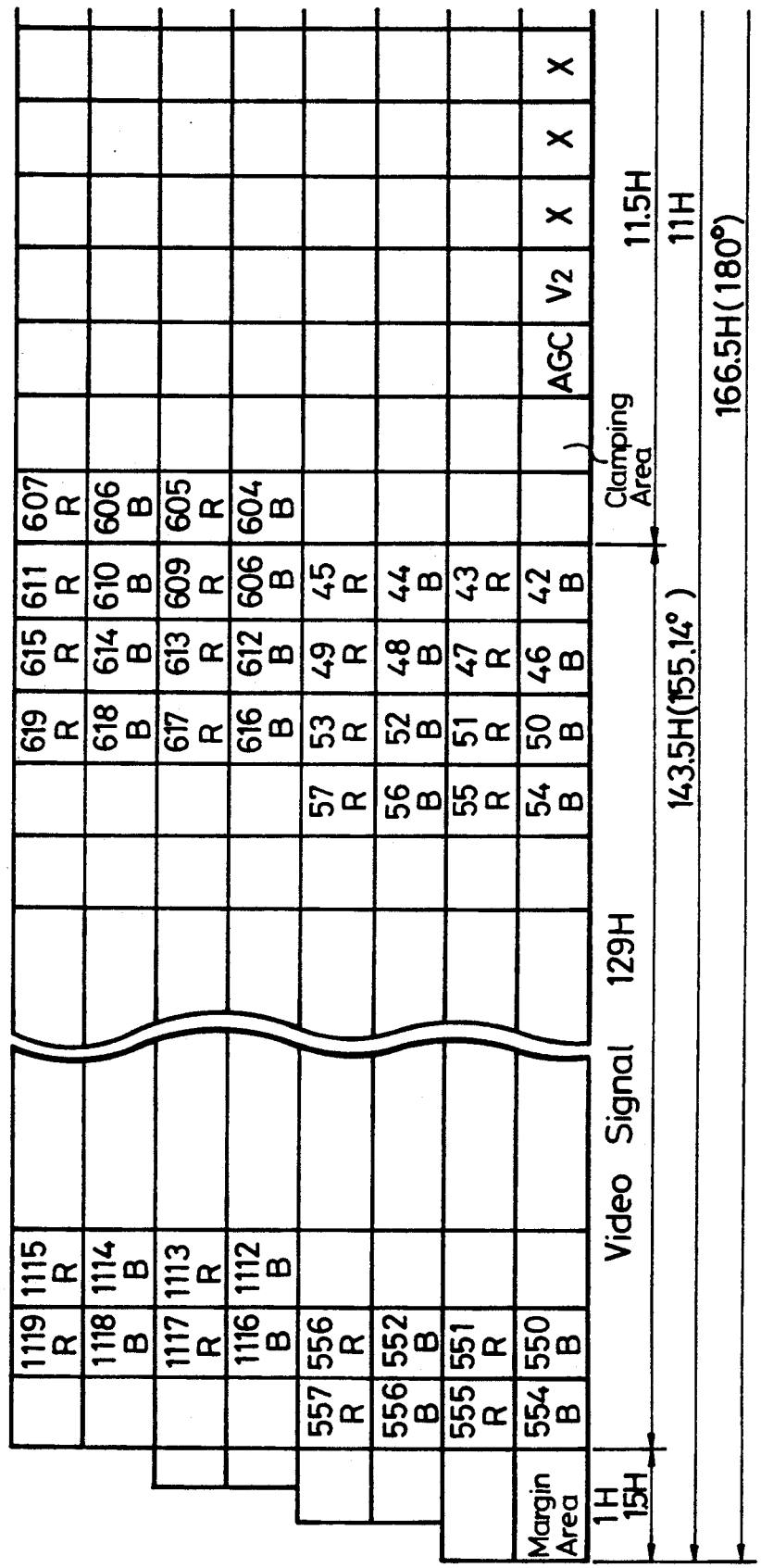

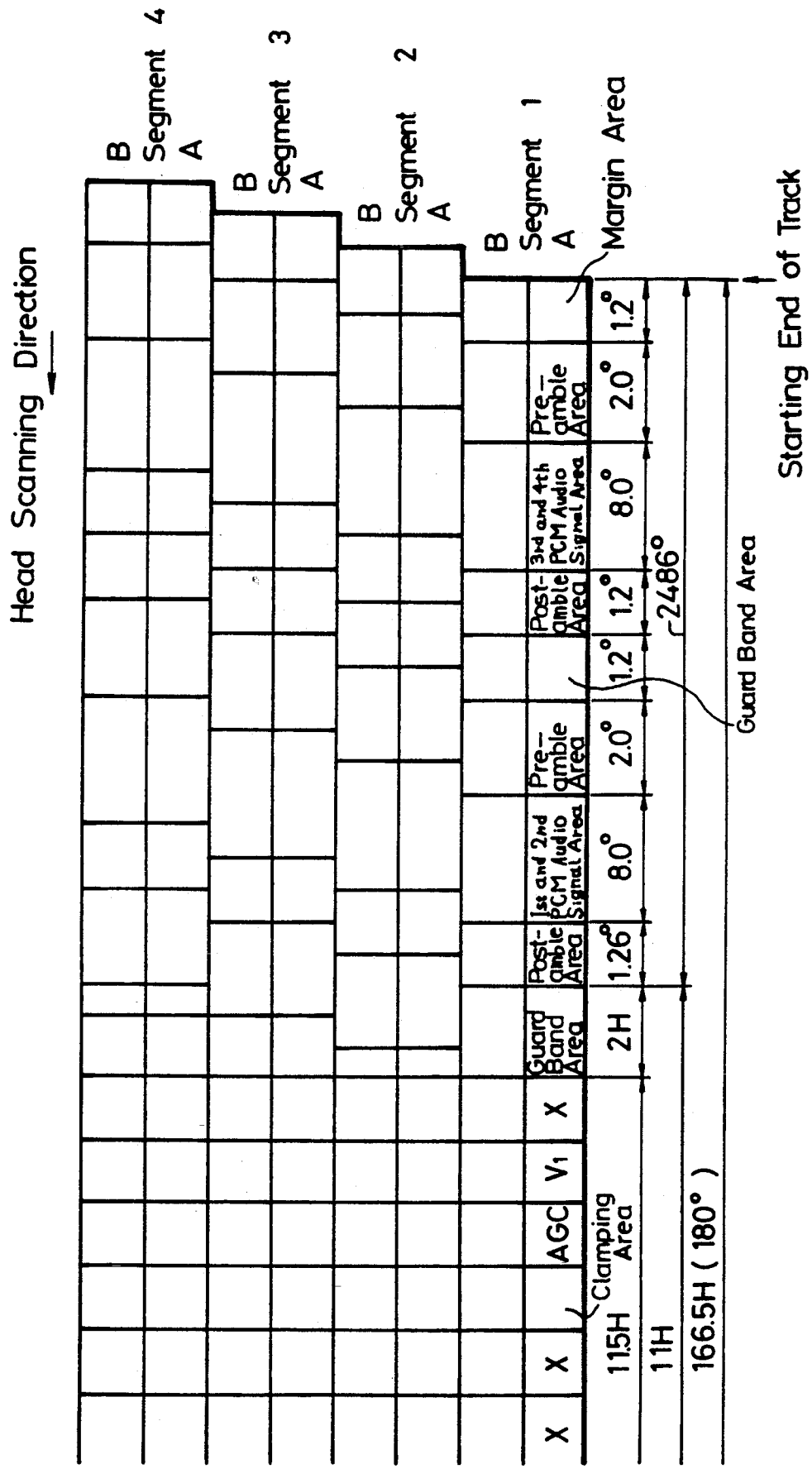

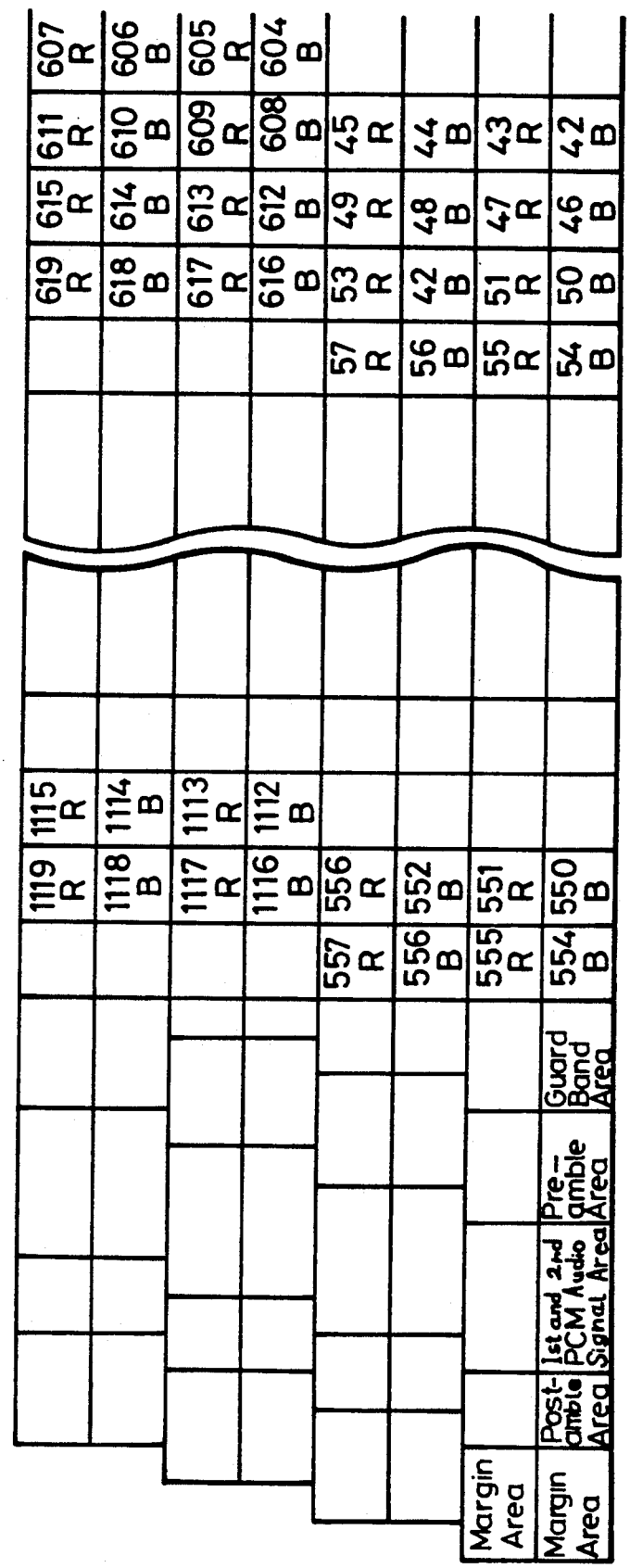

METHOD AND APPARATUS FOR RECORDING VIDEO INFORMATION SIGNALS TO AVOID INTERFERENCE DURING AFTER-RECORDING

BACKGROUND OF THE INVENTION

This invention relates to the recording of video and information signals, such as PCM audio information signals, in time division multiplexed form and, more particularly, to such recording of high definition television signals (HDTV signals) which minimizes the possibility of crosstalk interference in the event that the non-video information signals are recorded at a later time (known as "after-recording").

Video recording systems are known to record and reproduce a video signal and a pulse code modulated (PCM) audio signal. In one such system, the PCM audio signal may be modulated for recording purposes in a section of the frequency band that is separate and apart from the spectral band occupied by the video signal. This permits the PCM audio signals and the video signals to be frequency multiplexed and recorded in a common track on, for example, magnetic tape.

In another recording system, the magnetic tape is wrapped about a rotary head drum to define a wrap angle that extends for more than 180°; and the video signal is recorded in a track length corresponding to about 180° while the PCM audio signal is recorded in the remaining portion of the track that extends beyond the 180° length. In this latter system, the PCM audio signal is recorded first followed by the video signal, resulting in a track length corresponding to an angular extent of about 221°. That is, the rotary head which is used to record the PCM audio signal and the video signal rotates in contact with the magnetic tape over an angle of about 221°.

Often, it is desirable to record a video signal first and then, at some later time, record the audio signal, such as in a dubbing mode. This after-recording (as opposed to simultaneous recording) of the audio signal is quite difficult and complex to execute in the system wherein the video signal and the PCM audio signal are frequency multiplexed.

While after-recording of a PCM audio signal in a recording system of the type wherein the PCM audio signal and the video signal are time division multiplexed for recording in separate lengths of a record track is simpler to carry out, such after-recording, particularly when used for dubbing purposes, usually is performed in conjunction with video signal playback. That is, after a head scans a record track to reproduce video signals therefrom and then is changed over to a recording mode, when it reaches the discrete section of the track in which the PCM audio signal is to be recorded. However, and as will be described in greater detail below, when plural recording heads are used (as is common), at the time that one head is positioned for recording the PCM audio signal, the other head still is scanning the video portion of a track and, thus, the recording of the PCM audio signal overlaps in time with the reproduction of the video signal. Even though the same head is not used for simultaneous recording and playback, nevertheless, this overlap tends to reduce the quality of the reproduced video signal.

FIG. 1 illustrates the configuration of a magnetic tape wrapped about a rotary head drum over an angular extent of more than 180°, wherein the PCM audio signal and the video signal are recorded in a common track, with the PCM audio signal being recorded ahead, or upstream, of the video signal. If two heads spaced apart by 180° are mounted on the rotary head drum, it is seen that one head will be in position to reproduce the video signal when the other head is in position to record the PCM audio signal. To reduce the possible loss in quality of the reproduced video signal caused by this overlap condition, separate recording and playback amplifiers and a change-over switch normally are provided. However, because of inherent electronic and mechanical time delays and the desire to reproduce an entire video signal from a complete track, it is virtually impossible to reduce the overlap condition to zero. Moreover, such recording/playback circuitry is rather complicated and this too detracts from the reliability of the video tape recorder and tends to degrade the overall quality of its operation.

In another proposal in which the video and PCM audio signals are recorded in the same track, multiple tracks are recorded simultaneously by a number of record/playback heads. Here, the combined video and PCM audio signals are distributed to a plurality of channels, each of which is recorded by a respective head. When, for example, two tracks, or channels, are recorded simultaneously, the two heads used therefor are displaced from each other in the track-scanning direction by an amount corresponding to an angle $\Theta$. As shown in FIG. 2, the leading head is displaced from the trailing head by $\Theta$, resulting in a corresponding longitudinal displacement of the respective tracks due to the fact that the leading and trailing heads record signals simultaneously.

It is noted that, in the multi-track arrangement shown in FIG. 2, the trailing head scans the video signal recorded in one track simultaneously with the scanning by the leading head of the PCM audio signal recorded in the adjacent track. Thus, in the after-recording mode, during the angular extent $\alpha$, the trailing head plays back the video signal while the leading head records the PCM audio signal. Hence, the aforementioned overlap problem is present. Furthermore, because the PCM audio signal is adjacent the video signal during the angular extent $\alpha$, a crosstalk component tends to occur during signal playback because these adjacent signals are not correlated with each other.

To reduce the crosstalk phenomenon, the signal supplied for recording by the trailing head is delayed by an amount $\tau$ corresponding to this displacement angle $\Theta$. As a result, the simultaneous recording of, for example, two tracks appears as shown in FIG. 3, wherein these adjacent tracks are aligned or matched with each other. Both heads record the PCM audio signals and the video signals at the same time, and the presence of crosstalk due to the simultaneous scanning by the respective heads of non-correlated signals is avoided. However, the recording of matched, adjacent tracks nevertheless suffers from the drawback described in conjunction with FIGS. 4A-4C.

FIG. 4A illustrates the signals played back from successive scans of the tracks recorded on a magnetic tape. Let it be assumed, for simplification, that each track is formed with a leading section in which the PCM audio signal is recorded, followed by the video signal. Assuming that two tracks are recorded simultaneously by two heads angularly offset from each other by $\Theta$, and further assuming that the signal supplied to the trailing head is delayed by $\tau$ to compensate for this angular offset, FIGS. 4A and 4C illustrate the signals supplied for recording. The resultant tracks are matched, as shown in FIG. 3, and when the signals recorded therein are reproduced, to account for the time delay $\tau$, the signals reproduced by the leading head are delayed by this same amount $\tau$. Hence, FIG. 4B illustrates the signals reproduced by the trailing head and FIG. 4C illustrates the delayed signals reproduced by the leading head. It is appreciated that this delay $\tau$ imparted to the signals reproduced by the leading head is needed to restore proper synchronization to such signals.

Now, with this arrangement wherein plural adjacent tracks are recorded simultaneously, and wherein the signal supplied to the trailing head is delayed during recording while the signal reproduced by the leading head is delayed during playback, if the PCM audio signal is recorded in the after-recording mode, it is seen from FIGS. 4B and 4C that the trailing head is in position to play back the video signal while the leading head is in position to record the PCM audio signal. Similarly, the leading head is in position to play back the video signal while the trailing head is positioned to record the PCM audio signal. More particularly, at a time $t_0$, the trailing head is positioned to begin recording the PCM audio signal, as shown in FIG. 4B, but because of the delay imparted to the signal reproduced by the leading head, at time $t_0$ the video signal still is being reproduced therefrom. Conversely, at time $t_1$, the recording of the delayed PCM audio signals supplied to the trailing head (as shown in FIG. 4B) ends and the head begins to reproduce the video signal. But, at this time, the PCM audio signal still is being played back by the leading head (as shown in FIG. 4C). It is not until time $t_2$ that the delayed PCM audio signal reproduced by the leading head terminates. Hence, even though plural tracks are recorded simultaneously by plural heads, because of the aforementioned time delays needed during recording and reproduction to minimize crosstalk, the audio signal recorded in one track during the after-recording mode overlaps with the video signal reproduced from an adjacent track. Consequently, the aforementioned disadvantage of deterioration in the reproduced video signal due to this overlap is present.

OBJECTS AND SUMMARY OF THE INVENTION

Therefore, it is an object of the present invention to provide an improved technique for recording video and information signals on, for example, a magnetic tape, wherein the aforementioned disadvantages and drawbacks are avoided.

Another object of this invention is to provide a technique for recording PCM audio and video signals which avoids the aforementioned problem of overlap during an after-recording mode.

A further object of this invention is to provide a technique for recording video and PCM audio signals in a common track by a rotary head having a scanning angle of not more than 180°.

An additional object of this invention is to provide a technique for combining video signals and an information signal, such as a pulse code modulated audio signal, in time division multiplexed form for recording.

Still another object of this invention is to provide a technique for recording video and PCM audio signals on a video tape which facilitates the recording of PCM audio signals in the after-recording mode.

It is yet a further object of this invention to provide a technique which permits a video tape recorder to be constructed relatively simply and inexpensively for the multi-track recording of video and audio signals.

Another object of this invention is to provide a technique for recording video and PCM audio signals in plural tracks simultaneously by plural rotary heads, each track having an arcuate length of no more than 180°, wherein at least the video signal is timebase compressed to produce a guard band area on the track which avoids overlap of the video signal portion of one track with the PCM audio signal portion of an adjacent track.

Various other objects, advantages and features of the present invention will become readily apparent from the ensuing detailed description, and the novel features will be particularly pointed out in the appended claims.

SUMMARY OF THE INVENTION

In accordance with this invention, a technique is provided for recording video and information signals, such as PCM audio information signals, in slant tracks on a magnetic tape by rotary heads, wherein the tape is deployed about a wrap angle of no more than 180°. At least the video signal is timebase converted, whereafter it is time division multiplexed with the information signal for recording sequentially in a length of track less than the wrap angle such that successive tracks are formed, each containing the timebase converted video signal and the information signal.

As one aspect of this invention, each track includes a plurality of video signal line intervals which are timebase compressed. Each video signal line interval is digitized and timebase expanded so as to occupy, for example, approximately two line intervals. The timebase expanded line intervals are separated into respective channels, each comprised of plural (e.g. 2) line intervals, and each channel then is timebase compressed. In the preferred embodiment, the digitized video signals are comprised of line sequential color difference signals.

As another aspect, the information signal also is timebase compressed before being time division multiplexed with the timebase converted video signal. Advantageously, the timebase compressed information signal is positioned ahead of the timebase converted video signal so as to be recorded in a generally leading portion of a track. In another embodiment, one portion of the timebase compressed information signal is positioned ahead of the timebase converted video signal and another portion is positioned after the video signal. Consequently, four channels of audio signals may be recorded, with two channels in each of the aforementioned portions, or two channels of audio signals derived from different audio systems may be recorded, with the two channels of one system being recorded in the aforementioned first portion and the two channels of the other system being recorded in the aforementioned second portion.

As a feature of this invention, a guard band between the multiplexed information signal and the timebase converted video signal is provided, and two tracks of multiplexed signals are recorded simultaneously by two rotary heads angularly displaced from each other by $\Theta$. The angular extent $\Theta_V$ of the video signal, $\Theta_A$ of the information signal and $\Theta_{AV}$ of the guard band satisfies the following relationship: $\Theta_V + \Theta_A + \Theta_{AV} \leq 180° - \Theta$. Preferably, $\Theta_{AV} \geq \Theta$. Consequently, if an information signal is to be recorded at a later time in an after-recording mode, the positioning of the signals recorded in adjacent tracks is such that at the later time, the video signal is not reproduced from one track simultaneously with the recording of the information signal in an adjacent track.

BRIEF DESCRIPTION OF THE DRAWINGS

The following detailed description, given by way of example and not intended to limit the present invention solely thereto, will best be understood in conjunction with the accompanying drawings in which:

FIGS. 6A-6E are useful in understanding the manner in which video signals are recorded by the apparatus shown in FIGS. 5A and 5B;

FIG. 10 including FIGS. 10A and 10B are schematic representations of eight successive tracks in which a frame of HDTV signals is recorded together with PCM audio signals by the embodiment shown in FIGS. 5A and 5B;

DETAILED DESCRIPTION OF A PREFERRED EMBODIMENT

Figure 5B:
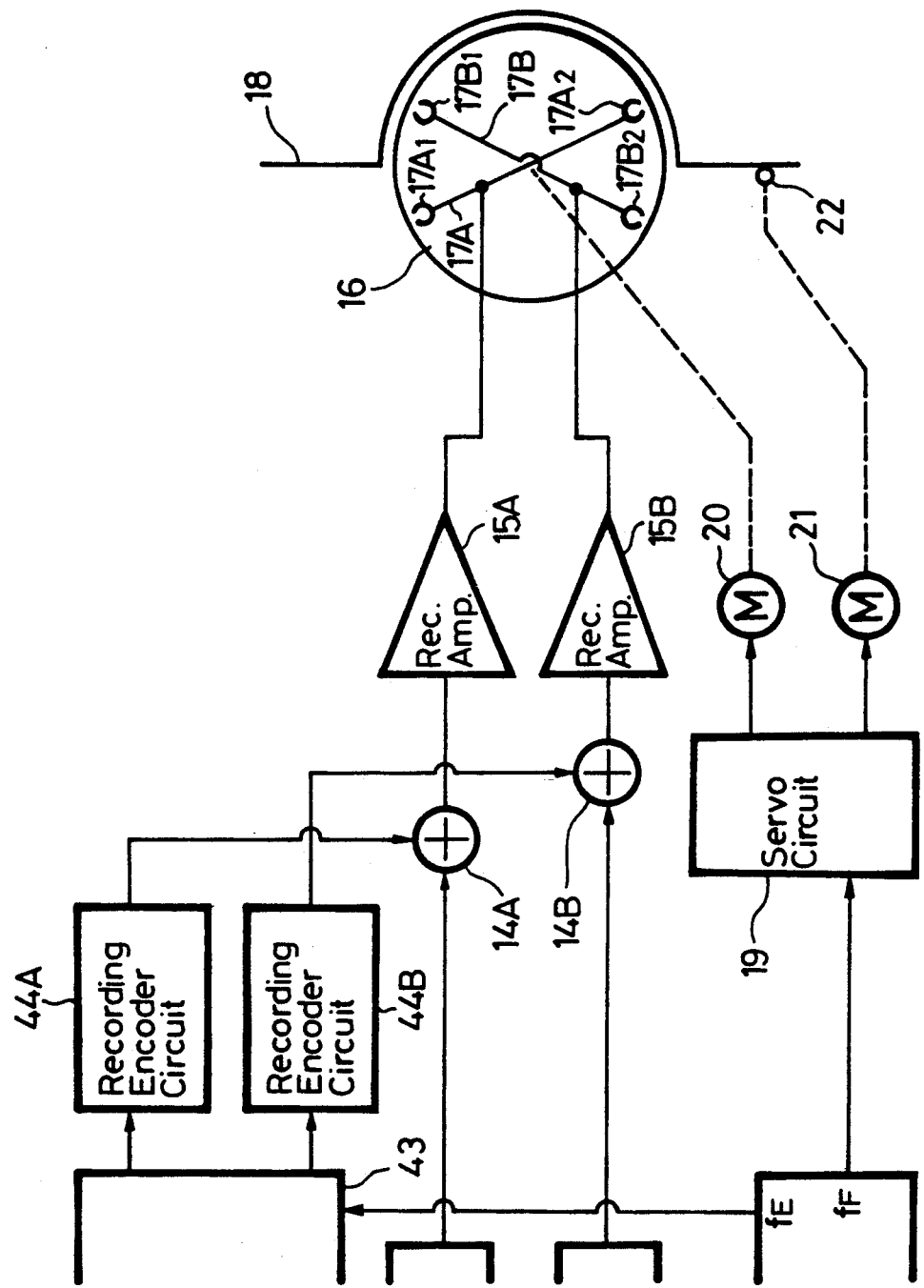
FIG. 5 including FIGS. 5A and 5B comprise a block diagram of a preferred embodiment for implementing the recording technique in accordance with the present invention.

Referring now to FIGS. 5A and 5B, there is illustrated a block diagram of a video tape recorder capable of recording and reproducing an HDTV signal and which may be of the general type described in Japanese Laid-Open Patent Publication No. 63-194494. As described therein, and as will be explained in greater detail below, the chrominance signal of the input HDTV signal is converted into a line sequential chroma signal which is timebase expanded, timebase compressed and multiplexed with the HDTV luminance component to form a TCI signal which then is separated into a plurality of channels for recording by a plural-channel head assembly. It is assumed, for the purpose of the present description, that the HDTV signal is separated into its luminance component Y, supplied to an input terminal 1, and red and blue chrominance components CR and CB supplied to input terminals 4r and 4b, respectively. The luminance component Y is digitized by an analog-to-digital (A/D) converter at a rate determined by a sampling clock signal of frequency $f_A$. The digitized luminance component is separated into two channels A and B and written into line memories 3A and 3B, respectively, in response to a write clock signal of frequency $f_A$. As will be discussed, alternate lines of the digitized luminance signal are written into line memories 3A and 3B, respectively.

The red and blue chrominance components supplied to input terminals 4r and 4b are in the form of red and blue color difference signals R-Y and B-Y, respectively. These color difference chrominance components are digitized by A/D converters 5r and 5b, respectively, at a rate determined by a sampling clock of frequency $f_B$. The digitized color difference signals then are written into line memories 6r and 6b, respectively.

A synchronizing signal included in the HDTV signal is separately supplied to an input terminal 7 for coupling to a control circuit 8. This control circuit is provided with a reference clock signal of frequency $f_x$ generated by a crystal oscillator 9 which, as is appreciated, exhibits a very stable frequency. The purpose of control circuit 8 is to generate several different clock signals derived from the reference clock frequency $f_x$ and synchronized with the HDTV synchronizing signal. These different clock signals are used to sample the luminance and chrominance components, to write the digitized luminance and chrominance components into line memories, to read those digitized components from the line memories, to timebase compress the luminance and chrominance components and to timebase compress a digitized audio signal, all of which are described below.

The digitized luminance components stored in line memory 3A are read therefrom in response to a read clock of frequency $f_C$ produced by control circuit 8. The digitized red color difference component CR written into line memory 6r is read from this line memory by the read clock $f_C$ and is combined in a summing circuit 10A with the luminance component read from line memory 3A. Similarly, the luminance component stored in line memory 3B is read therefrom by the read clock $f_C$ and is combined in summing circuit 10B with the blue color difference component CB read from line memory 6b.

Summing circuit 10A functions to combine odd line intervals of luminance component Y and odd line intervals of red color difference component CR to produce the combined signal TCI. Similarly, summing circuit 10B functions to combine the even line intervals of luminance component Y read from line memory 3B and even line intervals of blue color difference component CD read from line memory 6b to produce the signal TCI. These TCI signals produced by summing circuits 10A and 10B are written into a frame memory 11 in response to the read clock $f_C$.

The TCI signals of alternate line intervals stored in frame memory 11 are read therefrom at a rate which, in the present embodiment, is less than the memory write rate. Consequently, the frame memory functions to timebase expand the TCI signals; and these timebase expanded video signals are returned to analog form by digital-to-analog (D/A) converters 12A and 12B, respectively, at a rate determined by clock $f_C$ supplied to the D/A converters.

The analog signals produced by D/A converters 12A and 12B are coupled to emphasizing and frequency modulating circuits 13A and 13B, respectively, whereat the analog video signals are converted to FM signals for recording. These FM video signals are coupled to adders 14A and 14B, respectively (FIG. 5B), whereat they are combined with information signals (to be described) added thereto in multiplexed format. The resultant multiplexed signals are supplied to respective recording heads 17A and 17B by recording amplifiers 15A and 15B, respectively, as more clearly shown in FIG. 5B. It is appreciated that recording heads 17A and 17B are mounted on a recording head drum 16 which rotates to scan successive slant tracks across a magnetic tape 18 which is deployed about the head drum with a wrap angle no greater than 180°.

In the embodiment described herein, the information signals multiplexed with the video signals represent audio information and, more particularly, comprise pulse code modulated (PCM) audio signals. As more clearly shown in FIG. 5A, stereo right and left audio signals are supplied to input terminals 40R and 40L, respectively, for coupling to A/D converters 41R and 41L to digitize the audio signals. An audio signal recording and processing circuit 42 operates to encode the digitized audio signals as PCM signals and, preferably, processes the digitized signals in accordance with conventional error correction techniques. The resultant PCM audio signals are written into a frame memory 43 at a rate determined by a write clock $f_D$ produced by control circuit 8.

The PCM audio signals written into frame memory 43 are read therefrom at a read-out rate determined by a read clock $f_E$ generated by control circuit 8. As will be described, the frame memory serves to timebase compress the PCM audio signals; and these compressed signals are supplied to adding circuits 14A and 14B by way of encoder circuits 44A and 44B, respectively. The encoder circuits operate to encode the timebase compressed PCM audio signals in a form readily adapted for magnetic recording and, preferably, the shortest wavelength of the encoded PCM audio signals is longer than the shortest wavelength of the FM video signals produced by FM circuits 13A and 13B. As mentioned above, adder circuits 14A and 14B combine the PCM audio signals with the video signals in time division multiplexed form.

A servo circuit 19 (FIG. 5B) is supplied with a reference clock signal $f_F$ from control circuit 8 for controlling the rotation of heads 17A, 17B as well as the transport speed of tape 18. Accordingly, the servo circuit is adapted to control a head drive motor 20 which is coupled to head drum 16 for rotatably driving heads 17A and 17B. The servo circuit also is coupled to a capstan drive motor 21 which drives a capstan 22 to transport tape 18.

While FIGS. 5A and 5B illustrate the recording apparatus in accordance with the present invention, it will be appreciated that heads 17A and 17B are operable in a playback mode to reproduce the multiplexed video and PCM audio signals recorded on tape 18. In that event, circuitry that is analogous to but complementary of the circuitry described above is used to recover the signals recorded in each track, to separate those signals into separate video and audio signal processing channels and to process those separated signals to recover the original video and audio information.

In operation, the luminance component Y supplied to A/D converter 2 is sampled to produce digitized representations of successive line intervals as shown in FIG. 6A. In one embodiment, 1320 samples are generated during each line interval and, in accordance with this example, the horizontal blanking interval is comprised of about 200 samples.

Similarly, the red color difference component CR supplied to A/D converter 5r is digitized to produce digital representations of successive line intervals of the red color difference signal, as shown in FIG. 6B. The luminance component sampling clock frequency $f_A$ is approximately four times the chrominance sampling clock frequency $f_B$, whereupon the chrominance component is sampled at a rate sufficient to produce about 330 samples during each line interval. Of these, the horizontal blanking interval is comprised of approximately 50 samples.

In a similar manner, the blue color difference component CB supplied to A/D converter 5b is digitized in response to the chrominance sampling clock frequency $f_B$ to produce digital representations of successive line intervals, as shown in FIG. 6C.

In one embodiment, the reference clock frequency $f_x$ produced from crystal oscillator 9 is a fraction of the fundamental clock frequency of the HDTV signal, the latter being equal to 74.25 MHz. In this embodiment, $$f_x = f_A = (3/5) \times 74.25 = 44.55 \text{ MHz} = 1320 f_{H1}$$

wherein $f_{H1} = 33.75$ KHz and is the horizontal line frequency of the HDTV signal.

As mentioned above, $f_B = f_A/4 = 330 f_{H1}$.

In accordance with the foregoing, and as shown in FIGS. 6A–6C, the luminance component is represented by 1320 samples per line interval, the red color difference component CR is represented by 330 samples per line interval and the blue color difference component CB likewise is represented by 330 samples per line interval. The luminance component samples are written into line memories 3A and 3B, and the chrominance component samples are written into line memories 6r and 6b, respectively. In particular, each line memory has written thereinto alternate line intervals. Thus, the luminance component line intervals written into line memory 3A may be represented as $Y_1$, $Y_3$, $Y_5$, etc.; the luminance component line intervals written into line memory 3B may be represented as $Y_2$, $Y_4$, $Y_6$, etc.; the line intervals of the red color difference component written into line memory 6r may be represented as $CR_1$, $CR_3$, $CR_5$, etc. and the line intervals of the blue color difference component written into line memory 6b may be represented as $CB_2$, $CB_4$, $CB_6$, etc.

The alternate line intervals stored in the respective line memories are read therefrom at the read-out rate $f_C$ which, in the preferred embodiment, is about one-half the luminance write clock rate $f_A$. As a result, the luminance component read from line memories 3A and 3B is timebase expanded while the chrominance components read from line memories 6r and 6b are timebase compressed. The luminance component read from line memory 3A is combined with the chrominance component read from line memory 6r in summing circuit 10A, resulting in the TCI signal schematically illustrated in FIG. 6D. Similarly, the luminance component read from line memory 3B is combined with the chrominance component read from line memory 6b in summing circuit 10B to produce the TCI signal schematically illustrated in FIG. 6E. As a result, the combined samples read from line memories 3A and 6r occupy a duration corresponding to two HDTV line intervals, as shown in FIG. 6D; and, similarly, the combined samples read from line memories 3B and 6b occupy two HDTV line intervals, as shown in FIG. 6E. Notwithstanding this conversion of the time axis, substantially all of the luminance and chrominance component samples that had been written into the respective line memories are read therefrom. For convenience, the combined timebase converted video signal produced by summing circuit 10A is identified as the channel A timebase converted video signal and the combined timebase converted video signal produced by summing circuit 10B is referred to as the channel B timebase converted video signal.

If the number of horizontal line intervals included in an HDTV frame is represented as L, the number of samples generated during each line interval is represented as S and the read clock rate $f_C$ is half the luminance component write clock rate $f_A$, then the relationship between L, S and $f_C$ may be expressed as:

$$\frac{L \times S}{2f_c} = \text{Constant}$$

If L=1125, S=1320 and $f_C$=44.55/2 MHz, then:

$$\frac{L \times S}{2f_c} = \frac{1125 \times 1320}{44.55 \times 10^6}$$

From the foregoing relationship, it is appreciated that if the number of line intervals included in an HDTV frame increases and if the number of samples produced during each line interval also increases, then the read clock rate $f_C$ will increase. For example, if L=1332 and S=1500, then:

$$f_c = \frac{1332 \times 1500}{2} = 29.97 \text{ MHz} = 880 f_{H1} = \frac{37}{55} f_A$$

In the example discussed above, the channel A timebase converted video signal supplied to frame memory 11 by summing circuit 10A is comprised of odd line intervals of the luminance component Y and the red color difference component CR, as shown in FIG. 6D. Similarly, the timebase converted video signal supplied to the frame memory by summing circuit 10B is comprised of the even line intervals of the luminance component Y and the blue color difference component CB, as shown in FIG. 6E. If the read clock rate $f_C$ is greater than $f_A/2$, it is seen that the duration of each effective horizontal period of the time base converted video signal supplied to frame memory 11 is less than twice the HDTV line interval. However, for convenience, it is assumed herein that $f_C=f_A/2$ and, therefore, the duration of each of the channel A and channel B horizontal periods (shown in FIGS. 6D and 6E) is equal to twice the HDTV horizontal interval. The channel A and channel B timebase converted video signals are written into frame memory 11 at the $f_C$ rate.

After being written into the frame memory, the timebase converted video signals are read therefrom at the $f_C$ rate. Preferably, the channel A timebase converted video signals are supplied, by way of D/A converter 12A, emphasizing and FM circuit 13A, adding circuit 14A and recording amplifier 15A to head 17A. Similarly, the channel B timebase converted video signals are read from frame memory 11 and supplied to head 17B for recording. As heads 17A and 17B scan successive tracks across magnetic tape 18, the odd timebase converted line intervals shown in FIG. 6D are recorded in each track traced by head 17A and the even timebase converted line intervals are recorded in each track traced by head 17B. As will be described, heads 17A and 17B are included in two diametrically opposed head assemblies, with one such assembly being comprised of heads $17A_1$ and $17B_1$ and the other assembly being comprised of heads $17A_2$ and $17B_2$. The pair of heads included in each assembly are angularly displaced from each other in the scanning direction, as will also be described. Consequently, heads $17A_1$ and $17B_1$ simultaneously record adjacent tracks wherein the track recorded by head $17A_1$ is formed of odd line intervals and the track recorded by head $17B_1$ is formed of even line intervals; and when heads $17A_2$ and $17B_2$ simultaneously scan magnetic tape 18, head $17A_2$ records a track of odd line intervals and head $17B_2$ records a track of even line intervals.

In the embodiment wherein the read clock rate $f_C$ is slightly greater than one-half the write clock rate $f_A$, the duration, or horizontal period, of a timebase converted line interval read from frame memory 11 is less than twice the HDTV line interval. Thus, the timebase converted video signal in, for example, channel A does not completely "fill" the converted (or doubled) HDTV line interval. Therefore, all of the timebase converted video signals read from frame memory 11 when, for example, head $17A_1$ traces a track may be recorded in a length that is less than the angular extent that this head is in contact with the tape. Stated otherwise, and from the geometry shown in FIG. 5B, the timebase converted video signal recorded in each track occupies a length that is less than the 180° angular extent that the head contacts the tape. As will now be described, this extra, or blank space in the track is occupied by the PCM audio signal produced by audio signal recording and processing circuit 42.

A/D converters 41R and 41L sample the stereo audio signals applied to input terminals 40R and 40L, respectively, at a sampling rate equal to, for example, 48 KHz. Alternatively, these stereo audio signals may be sampled at a 32 KHz rate. In any event, the digitized audio signals are encoded by audio signal recording and processing circuit 42 to PCM audio signals in a manner well known to those of ordinary skill in the art. These PCM audio signals are written into frame memory 43 at the write rate $f_D$. Thereafter, the stored PCM audio signals are read from frame memory 43 at a rate determined by the read clock frequency $f_E$. If $f_E$ is greater than $f_D$, the PCM audio signals read from the frame memory are timebase compressed relative to the PCM audio signals that had been written thereinto. In the preferred embodiment, the PCM audio signals read from frame memory 43 are positioned, along the time axis in those blank intervals in each track that are formed by the effective compression of the horizontal period of the timebase converted video signals. These PCM audio signals read from the frame memory are encoded by encoder circuits 44A and 44B and then time division multiplexed by adding circuits 14A and 14B with the channel A and B timebase converted video signals, respectively. In the preferred embodiment, the length of track occupied by the PCM audio signal plus the length of track occupied by the timebase converted video signal nevertheless is less than the overall length of the track recorded on the tape. Assuming that head $17A_1$, for example, undergoes a scanning trace of 180°, the PCM audio signal plus the timebase converted video signal are recorded by head 17A in a trace that is less than 180°.

Figure 7A:
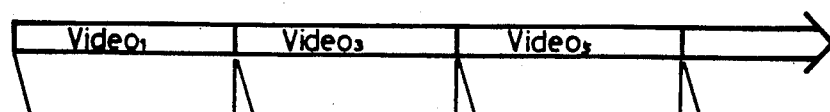
FIGS. 7A-7D are timing diagrams which are useful in understanding the timebase compression operation used with the present invention.

As shown in FIG. 7A, let it be assumed that the luminance component of the video signal read from line memory 3A at the read rate $f_C = \frac{1}{2} f_A$ occupies a track length whose angular extent is 180°. As shown in FIG. 6D, since the multiplexed luminance and chrominance components normally occupy a horizontal period equal to twice the HDTV line interval (assuming that the line memories are read at a rate that is one-half the luminance component write rate or $f_C = \frac{1}{2} f_A$), FIG. 7A is a reasonably accurate depiction of the angular extent of the line sequential video signal (i.e. the multiplexed luminance and chrominance components) which would occupy an angular extent of 180°. For convenience, FIG. 7A illustrates successive line intervals $VIDEO_1$, $VIDEO_3$, $VIDEO_5$, etc. written into frame memory 11. It is appreciated that successive even line intervals are written into the frame memory on another channel.

Figure 7B:
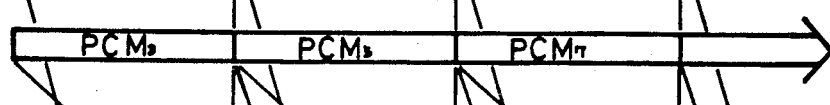

Similarly, FIG. 7B represents successive intervals of PCM audio signals, designated $PCM_3$, $PCM_5$, $PCM_7$, etc., written into frame memory 43.

Figure 1:
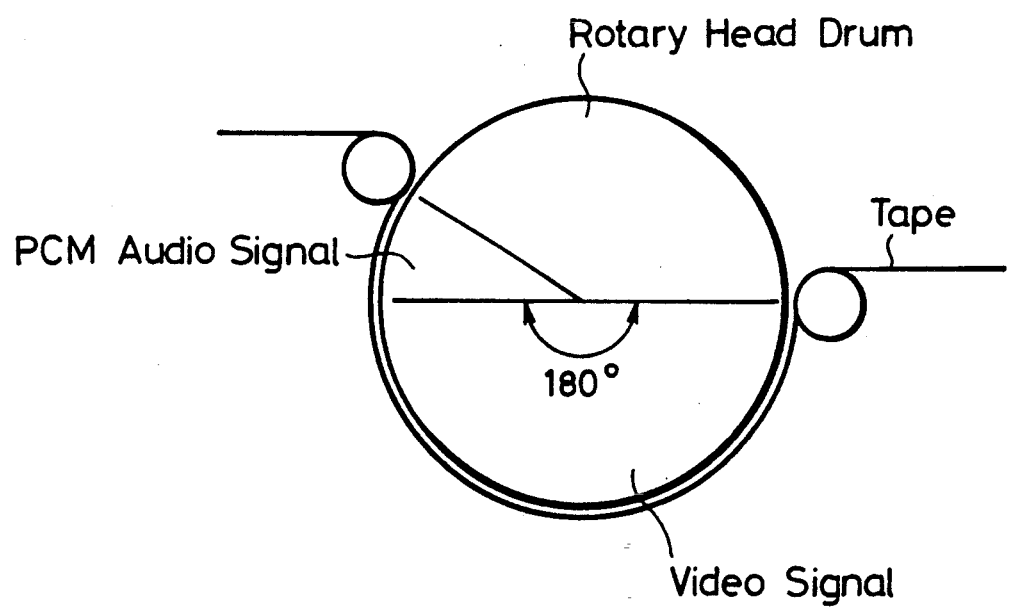
FIG. 1 is a schematic representation of a prior art video recording assembly wherein a PCM audio signal and a video signal may be recorded in the same track.
Figure 2:
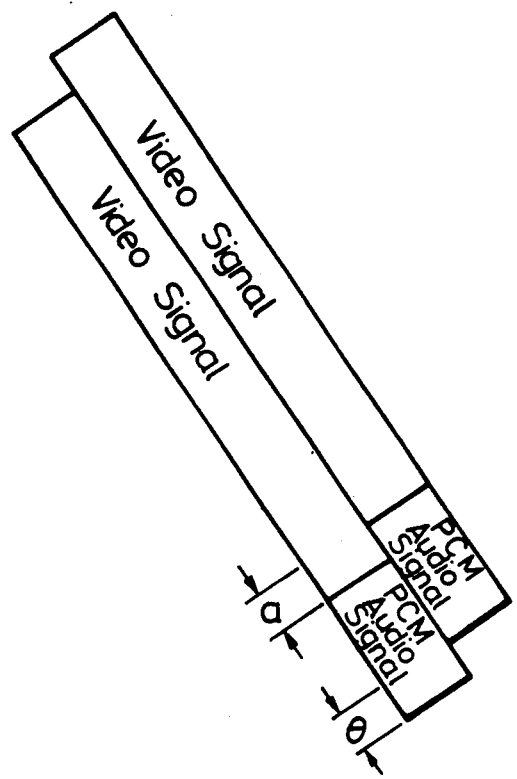
FIG. 2 is a schematic representation of adjacent tracks recorded simultaneously by prior art recording apparatus.
Figure 3:
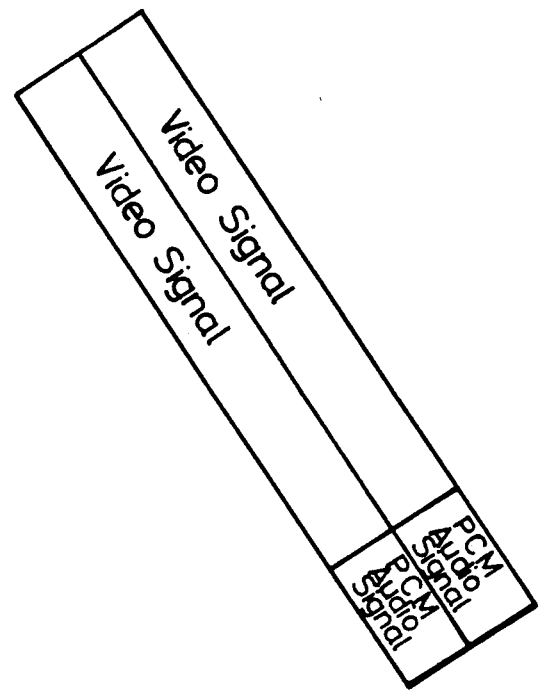
FIG. 3 is a schematic representation of the manner in which adjacent tracks may be recorded simultaneously with reduced crosstalk interference therebetween.
Figures 4A, 4B, 4C:
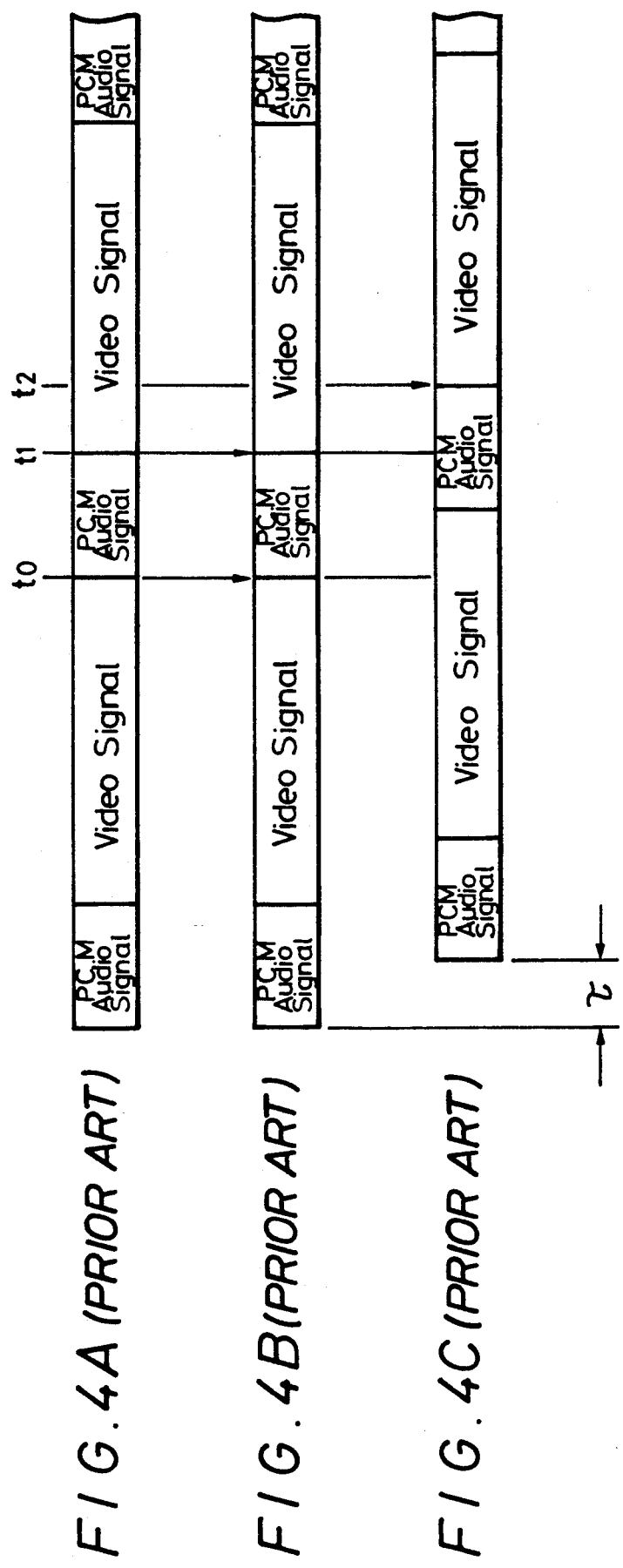
FIGS. 4A-4C are schematic representations which illustrate the drawback of overlap which is present when the information recorded in the tracks shown in FIG. 3 are reproduced.
Figure 7C:
Figure 7D:

Since the rate at which the video signals written into frame memory 11 is greater than $f_A/2$, the actual horizontal period of such video signals is less than the doubled HDTV line interval, as depicted in FIG. 7C. Thus, the timebase converted video signal recorded by, for example, head $17A_1$, occupies a length that is less than the length of the track normally recorded by this head. Now, by reading the PCM audio signal from frame memory 43 at a rate that is greater than its write rate, the PCM audio signal is compressed, as shown in FIG. 7D. It is appreciated that the phase of read clock $f_C$, used to read the video signal from frame memory 11, and the phase of the read clock $f_E$, used to read the PCM audio signal from frame memory 43, are controlled such that the PCM audio signal read from frame memory 43 is time positioned ahead of the timebase compressed video signal. Consequently, the PCM audio signal is recorded ahead of the timebase converted video signal, consistent with the format discussed above in conjunction with FIGS. 2–4.

Figure 8:
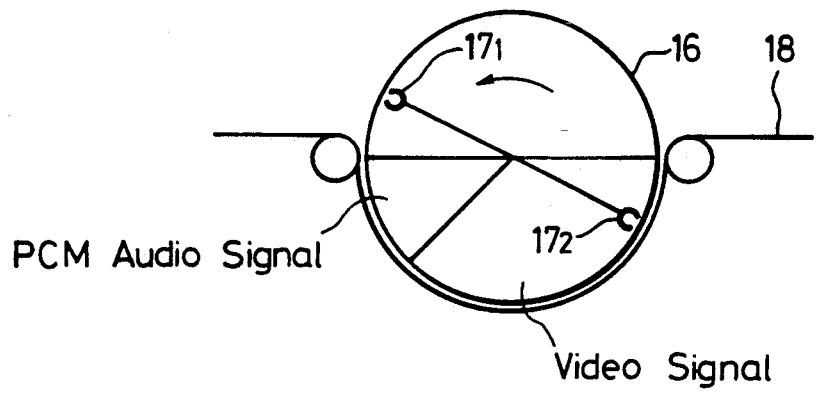
FIG. 8 is a schematic representation of recording apparatus used to implement the present invention.

As shown in FIG. 8, head assembly $17_1$ (which, preferably, is comprised of heads $17A_1$ and $17B_1$) and head assembly $17_2$ (which, preferably, is comprised of heads $17A_2$ and $17B_2$) scan successive tracks across tape 18. In accordance with the foregoing discussion of FIGS. 7C and 7D, each head assembly records the PCM audio signal (as shown in FIG. 7D) in a limited length of track following initial contact of the head with the tape, and records the timebase converted video signal thereafter. It is appreciated that the rotary speed and phase of the heads is controlled by servo circuit 19 in response to a reference clock $f_F$ which, for example, may be on the order of 60 Hz. Likewise, the speed at which tape 18 is transported also is controlled by 16 the servo circuit to insure uniform tracks of pitch p. Preferably, and as will be described below, the effective length of the recorded PCM audio signal plus the effective length of the recorded video signal is less than 180°. Consequently, the drawback of overlap that has been present heretofore when audio signals are recorded in an after-recording mode is avoided.

In the preferred embodiment, the PCM audio signal is positioned ahead of the timebase converted video signal, as shown in FIG. 8. It will be appreciated that, when a head, such as head $17A_1$, first contacts tape 18, a film of air between the head and tape is relatively thick resulting in a so-called spacing loss. This spacing loss deteriorates the quality of an analog signal that may be recorded; but because of the inherent qualities of a digital signal, there is little, if any, negative affect on the recording of the digital signal. Consequently, by positioning the PCM audio signal ahead of the video signal, deterioration in the recording of the video signal that would otherwise be attributed to spacing loss is avoided.

Figure 9:
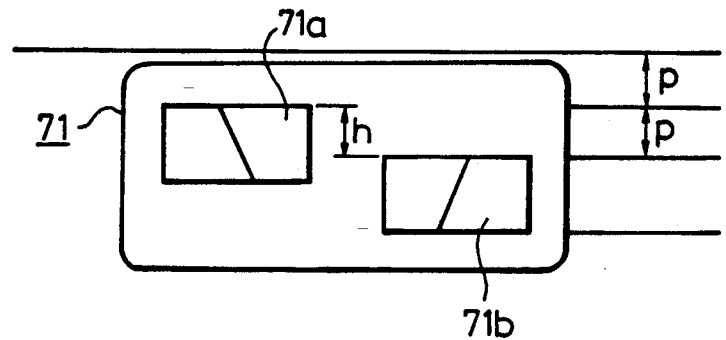
FIG. 9 is a schematic representation of a record-/playback head assembly used with the present invention.

As mentioned previously, it is preferred that heads $17A_1$ and $17B_1$ are included in one head assembly, such as head assembly $17_1$ (FIG. 8), and heads $17A_2$ and $17B_2$ are included in another head assembly (such as head assembly $17_2$). FIG. 9 schematically illustrates a typical head assembly 71 comprised of a pair of heads $71a$ and $71b$ which are displaced, or offset from each other in the track scanning direction and are additionally displaced from each other by an amount h in a direction parallel to the axis of rotation. It is appreciated that this displacement h defines the track pitch p. FIG. 9 also schematically illustrates different azimuth angles formed in heads $71a$ and $71b$ which, as is known to those of ordinary skill in the art, minimizes crosstalk interference due to the picking up of signals from an adjacent track that had been recorded with a head having a different azimuth. Head assembly 71 is effective to record two slant tracks simultaneously by heads $71a$ and $71b$, respectively, as this head assembly rotates to scan a trace across tape 18. It is seen from FIG. 8 that one complete rotation of rotary drum 16 results in the tracing of four successive tracks, two by head assembly $17_1$ and two by head assembly $17_2$. In the preferred embodiment, one frame of the HDTV signal is recorded in eight tracks and, therefore, two complete rotations of head drum 16 are effective to record one frame of the HDTV signal. Stated otherwise, the heads are rotated at twice the HDTV frame rate.

FIGS. 10A and 10B illustrate one embodiment of the pattern recorded by two rotations of head assemblies $17_1$ and $17_2$ to record one frame of the HDTV signal together with the PCM audio signal. It will be appreciated that, during the first half of the first rotation of head drum 16, tracks A and B of segment 1 are recorded by heads $17A_1$ and $17B_1$, respectively. Although not shown in FIGS. 5A and 5B, it should be understood that the multiplexed video and PCM audio signals supplied to the trailing head (such as head $17B_1$ or head $17B_2$ in the configuration shown in FIG. 8) is delayed by an amount sufficient to align or match the starting ends of tracks A and B. During the second half of the first rotation, heads $17A_2$ and $17B_2$ record tracks A and B of segment 2. In similar fashion, during the first half of the second rotation, heads $17A_1$ and $17B_1$ record tracks A and B in segment 3; and during the second half of this second rotation, heads $17A_2$ and $17B_2$ record tracks A and B of segment 4. Accordingly, one frame of the HDTV signal is recorded in four segments, each segment being formed of two tracks in which two channels are recorded, respectively. It is seen that the PCM audio signal is recorded ahead of the timebase converted video signal in the blank portion produced as a result of the timebase compression of the video signal.

As shown in FIGS. 10A and 10B, each track is sufficient to record 166.5 horizontal periods, each period being somewhat less than twice the HDTV line interval. Included in these 166.5 horizontal periods are the PCM audio signal, the timebase converted video signal and several periods in which other information may be recorded. More particularly, the 166.5 horizontal periods correspond to a tape wrap angle of 180°, of which 23.66° is allocated for the recording of audio information. The beginning portion of a track, corresponding to about 1.2°, comprises a margin area during which the recording head moves into contact with the tape sufficient to record the PCM audio signal.

A preamble area corresponding to 2.0° follows the margin area; and two channels of PCM audio signals are recorded thereafter in a length corresponding to 8.0°. A post-amble area of 1.2° follows the PCM audio signal section, and this, in turn, is followed by a guard band area corresponding to 1.2°. The preamble, PCM audio signal and post-amble areas comprise a first audio signal recording section. Then, a second audio signal recording section is recorded, comprised of a preamble area of 2.0°, a PCM audio signal area of 8.0° and a post-amble area of 1.26°. A guard band area of length corresponding to 2 horizontal periods separates the audio signal recording area from the video signal recording area. As an example, a length of 2 horizontal periods (2 H) corresponds to about 2.16°.

The beginning portion of the video signal recording area contains information signals such as vertical synchronizing signals $V_1$ and $V_2$, automatic gain control (AGC) signals, clamping signals, and the like. These signals are recorded in a section of the track which precedes the timebase converted video signal information and has a length of, for example, 11 or 11.5 horizontal periods. For example, this section of the video signal recording area is comprised of 11 horizontal periods (11 H) when odd segments (e.g. segments 1 and 3) are recorded and has a length of 11.5 H when even segments (e.g. segments 2 and 4) are recorded. This is illustrated more particularly in FIG. 10B.

The timebase converted video signals then are recorded in the video signal recording area following the recording of these information signals. As illustrated in FIG. 10A, 129 horizontal periods (129 H) of timebase converted video signals are recorded in the video signal recording area. Each track then concludes with a margin area of length corresponding to 1 H or 1.5 H. If the aforementioned information signals are recorded in an area corresponding to 11 H, such as in the odd segments, then this concluding margin area is of a length equal to 1.5 H. However, if the information signals are recorded in a length corresponding to 11.5 H, as in the even segments, then this margin area is recorded with a length of 1 H.

It will be recognized that, in a given track, only red color difference chrominance components or only blue color difference chrominance components are multiplexed with the luminance component for recording. For example, in each track A, the luminance component is multiplexed with the blue color difference component. However, in each track B, the luminance component is multiplexed with the red color difference component. The respective original HDTV line intervals from which the multiplexed luminance and chrominance components are derived also are indicated in FIG. 10A.

It is seen that 143.5 horizontal periods, corresponding to a length of 155.14°, are recorded from the beginning of the first guard band area to the end of a track. This length is comprised of the following signals:

| | |
|---|---|
| Guard Band Area | 2.0 H |
| Information Signal Area | 11.0 H |
| Video Signals | 129.0 H |
| Margin Area | 1.5 H |
| Total Length | 143.5 H |

In FIG. 10B, two PCM audio signal sections are provided in the audio signal recording area. This permits the recording of audio information from two audio systems, each comprised of two channels. For example, left and right stereo audio signals may be recorded in one PCM audio signal recording section and two channels of SAP audio signals may be recorded in the other PCM audio signal recording section. Of course, the present invention is not limited to the particular channels, audio systems or audio information that is recorded in the audio signal recording area. Nevertheless, it is seen that the PCM audio signals recorded in one section may be independent of the PCM audio signals recorded in the other and, similarly, these signals may be recorded independently of each other in the after-recording mode.

Figure 11B:
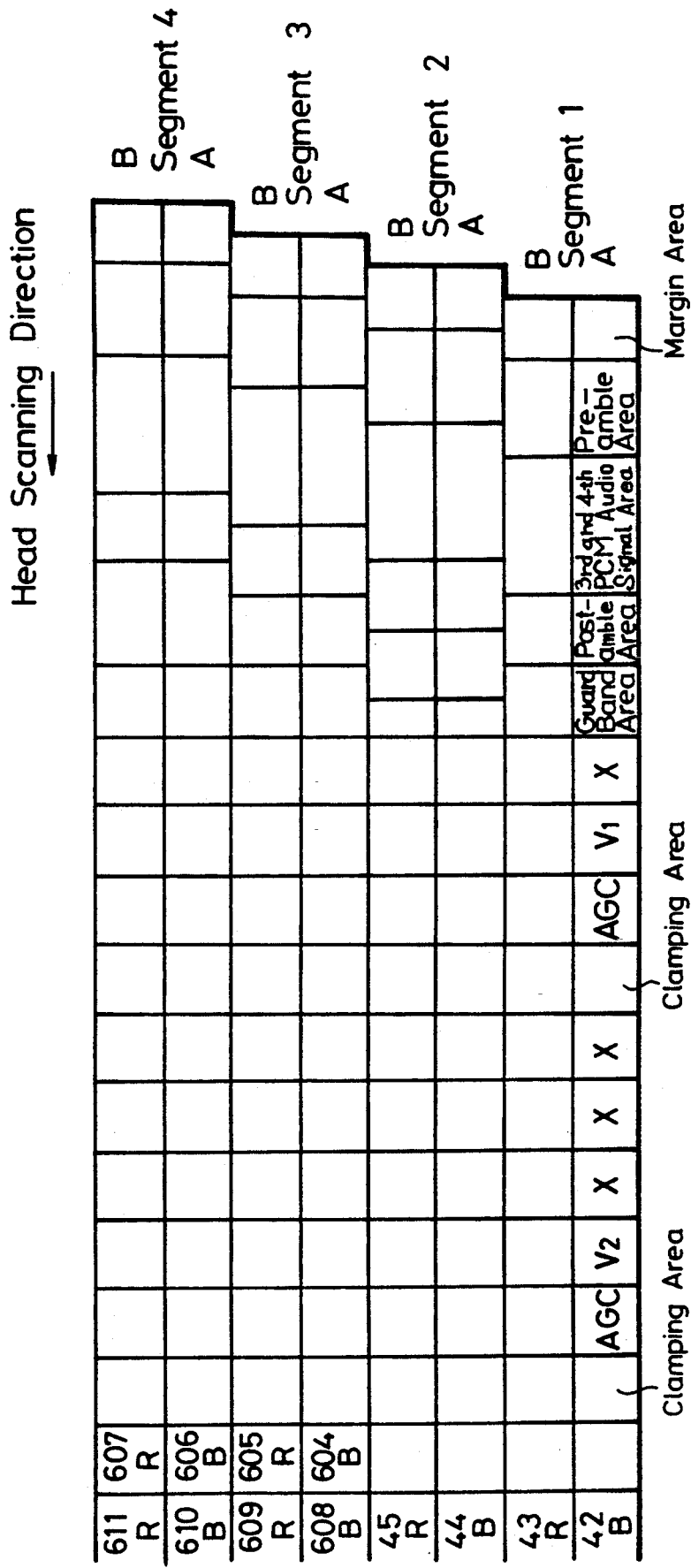
FIG. 11 including FIGS. 11A and 11B comprise a schematic representation of eight successive tracks in which a frame of HDTV and PCM audio signals is recorded in accordance with a modified embodiment of the present invention.

An alternative track pattern that may be recorded by the present invention is illustrated in FIGS. 11A and 11B. It will be seen that the track pattern of FIG. 11 is similar to the track pattern of FIG. 10, except that the audio signal recording area in FIG. 11 is divided into two separate areas, one preceding the video signal recording area (as in the FIG. 10 embodiment) and one following the video signal recording area. Both the preceding and following audio signal recording areas are comprised of a preamble section followed by a PCM audio signal recording section, followed by a post-amble section. Moreover, in each audio signal recording area, a guard band section separates the audio signal information from the video signal information. Additionally, a margin section is provided as the first and last areas (leading and trailing sections) in a track to facilitate the initiation and release of head contact with the tape.

As mentioned previously, encoder circuits 44A and 44B encode the PCM audio signal for recording in a format such that the shortest recording wavelength of the PCM audio signal is longer than the shortest recording wavelength of the frequency modulated, timebase converted video signal. Consequently, attenuation and distortion of an analog video signal at the beginning and end of a track scan are reduced because such distortion is substantially minimized in the presence of spacing loss when digital signals (such as the PCM audio signals) are recorded or reproduced.

As a result of the timebase compression of the video signal carried out by the line and frame memories, depicted in FIGS. 7A and 7C, and the timebase compression of the PCM audio signal carried out by frame memory 43, depicted in FIGS. 7B and 7D, the angular extent of the length of the recorded timebase converted video signal may be represented as $\Theta_V$, the angular extent of the length of the PCM audio signal may be represented as $\Theta_A$ and the angular extent of the guard band recorded between the PCM audio and video signals may be represented as $\Theta_{AV}$. Now, if the angular displacement of heads 17A₁ and 17B₁ (or heads 71a and 71b) is equal to $\Theta$, and if the length of a track is equal to 180° (i.e. the wrap angle of magnetic tape 18), then the respective lengths of the recorded video signal, recorded PCM audio signal and guard band may be expressed as:

$$\Theta_V + \Theta_A + \Theta_{AV} \leq 180° - \Theta.$$

Figure 12:
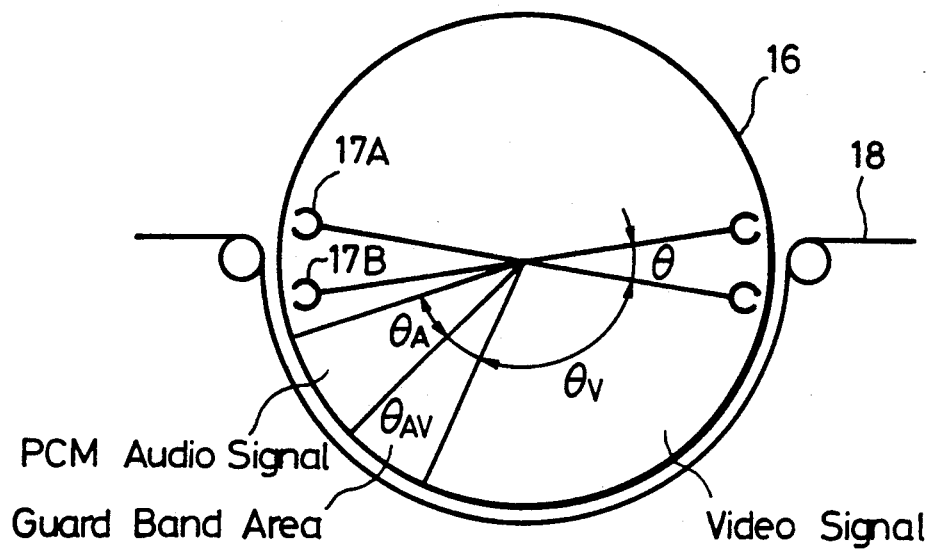
FIG. 12 is a schematic diagram illustrating the angular extent of the respective signals recorded in a track by the apparatus shown in FIGS. 5A and 5B.

FIG. 12 schematically illustrates these respective angular extents recorded by heads 17A and 17B, wherein head 17A is assumed to be the trailing head. Preferably, the length $\Theta_{AV}$ of the guard band area is greater than the angular displacement of the heads, or $\Theta_{AV} \geq \Theta$.

Figure 13:
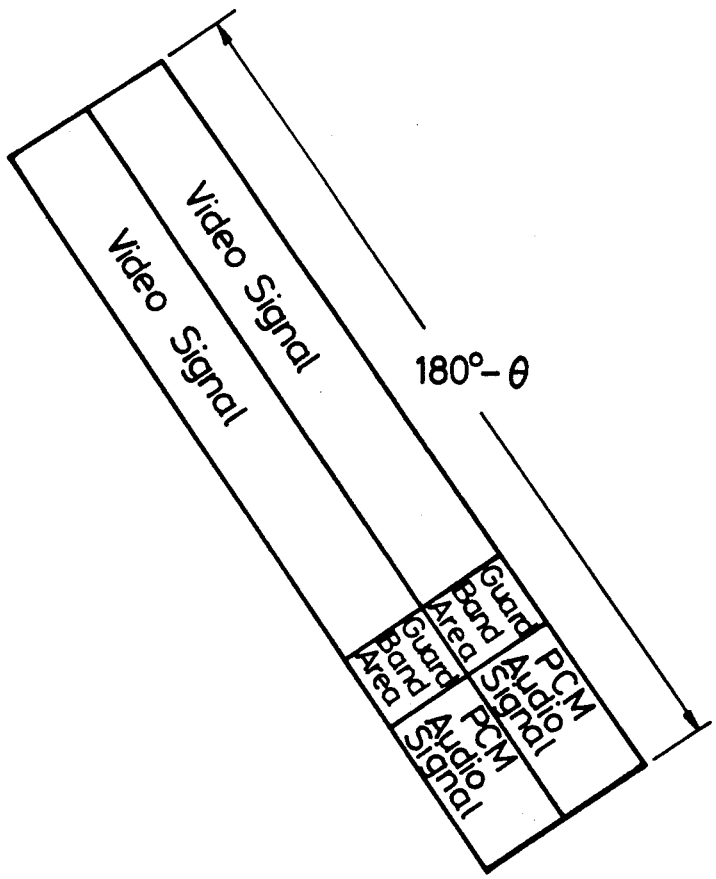
FIG. 13 is a schematic representation of two adjacent, matched tracks recorded simultaneously in accordance with the present invention.

To align the beginning of the adjacent tracks recorded by, for example, heads 17A₁ and 17B₁ so as to form the track patterns shown in FIGS. 10 and 11, the multiplexed video and PCM audio signals supplied to the trailing head, such as head 17A in FIG. 12, are delayed by an amount $\tau$ corresponding to the head displacement $\Theta$. As a result, the tracks which are recorded simultaneously by heads 17A and 17B are in alignment, as shown in FIG. 13. The effective length of each track is seen to be 180°-$\Theta$; and consistent with the track patterns shown in FIGS. 10 and 11, the sum of the leading and trailing margin areas in each track may exhibit a length equal to $\Theta$.

Figures 14A, 14B:
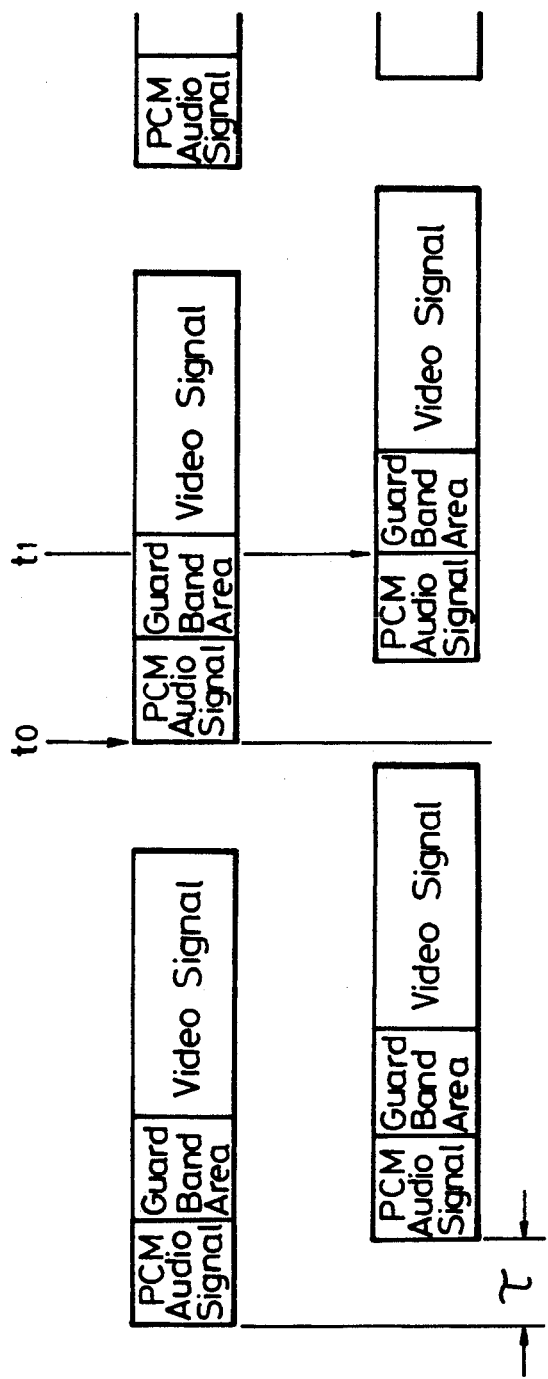
FIGS. 14A and 14B are timing diagrams which are useful in understanding the advantages derived from the present invention.

When signals recorded in accordance with the present invention are reproduced, the signals played back by the leading head are delayed by $\tau$ so as to compensate for the delay imparted to the signals recorded by the trailing head. FIG. 14A schematically illustrates the signals reproduced from a track by the trailing head and FIG. 14B schematically illustrates the signals reproduced from a track by the leading head. The delay imparted to the signals reproduced by the leading head also is illustrated in FIG. 14B. If the PCM audio signal is recorded in an after-recording mode, it is seen that when the leading head begins to record the PCM audio signal at time t₀ (FIG. 14A also represents the signals recorded by the leading head), the trailing head will have completed its reproduction of the video signal. Similarly, at time t₁ the trailing head completes its recording of the PCM audio signal, but the leading head still passes over the guard band separating the PCM audio and video signals and will not yet have begun to reproduce the video signal. Consequently, in the after-recording mode, there is no overlap between the reproduction of the video signal by one head and the recording of the PCM audio signal by the other. Therefore, deterioration in the quality of the reproduced video signal is avoided.

While the present invention has been particularly shown and described with reference to a preferred embodiment, it will be readily appreciated by those of ordinary skill in the art that various changes and modifications may be made without departing from the spirit and scope of the invention. For example, each head assembly has been described as including two heads for recording two tracks simultaneously. If desired, three or more heads may be provided in each head assembly, whereupon the angular displacement $\Theta$ discussed above corresponds to the angular displacement between the first, or leading head of the assembly and the trailing, or last head therein. Furthermore, the present invention is not limited solely to the recording of HDTV and audio signals. If desired, a standard video signal may be recorded in accordance with this invention. Additionally, other information may be time division multiplexed with the video signals for recording, and the present invention is not limited solely to the use to PCM audio signal information.

Therefore, it is intended that the appended claims be interpreted as including the embodiment described herein, alternatives which have been discussed above and all equivalents thereto.

What is claimed is:

1. A method of recording video and information signals in video and information sections of slant tracks on a magnetic tape having a wrap angle of no more than about 180°, wherein plural tracks are scanned simultaneously to record signals in locations in said plural tracks, said method comprising the steps of:
   timebase converting at least the video signal;
   time division multiplexing the timebase converted video signal and the information signal, providing a guard band therebetween;
   supplying the time division multiplexed signals to plural recording heads angularly separated by $\Theta$ for substantially simultaneously recording the plural tracks, wherein the time division multiplexed signals supplied to one of said plural recording heads is delayed by an amount $\tau$ corresponding to $\Theta$ and wherein the guard band is recorded in an angular extend $\Theta_{AV}$ of a track, where $\Theta_{AV} \geq \Theta$; and
   recording the time division multiplexed signals sequentially in a length of track less than said wrap angle to align the positions of the video and information sections of the simultaneously scanned plural tracks with each other and to position the timebase converted video signal and the information signal in adjacent tracks relative to each other such that when said adjacent tracks are subsequently scanned simultaneously to after-record a new information signal in one track and to reproduce a previously recorded timebase converted video signal from an adjacent track, the information section in said one track is located at a position sufficiently shifted from the video section in the adjacent track so that such recording and reproducing do not occur concurrently.

2. The method of claim 1 wherein each track includes a plurality of video signal horizontal periods, and wherein the step of converting at least the video signal comprises timebase compressing said plurality of horizontal periods.

3. The method of claim 2 wherein said step of timebase converting at least the video signal further comprises digitizing each video signal line interval, timebase expanding the digitized line intervals, and separating the timebase expanded line intervals into respective channels, each channel comprising a plurality of timebase expanded line intervals, prior to the timebase compression thereof.

4. The method of claim 3 wherein the video signal includes luminance and chrominance components; wherein the step of timebase expanding comprises timebase expanding the digitized line intervals of the luminance component to a horizontal period greater than that of a line interval; and further comprising the steps of timebase compressing the chrominance component in each line interval, and combining the timebase-expanded luminance component and the timebase-compressed chrominance component to form a timebase-expanded digitized video signal line interval.

5. The method of claim 4 wherein the chrominance component comprises color difference signals, wherein the step of combining comprises combining line sequential, timebase-compressed color difference signals with the timebase-expanded luminance component; and wherein the step of separating comprises separating the combined signals into two channels comprised of alternate timebase-expanded line intervals of the luminance component and alternate, mutually exclusive timebase-compressed line intervals of the color difference signals.

6. The method of claim 2, further comprising the step of timebase compressing the information signal before it is time division multiplexed with the timebase converted video signal.

7. The method of claim 6 wherein the step of time division multiplexing comprises positioning the timebase-compressed information signal ahead of the timebase converted video signal.

8. The method of claim 6 wherein the step of time division multiplexing comprises positioning a first portion of the timebase-compressed information signal ahead of the timebase converted video signal and positioning a second portion of the timebase-compressed information signal after the timebase converted video signal.

9. The method of claim 6 wherein the information signal is a PCM audio signal.

10. The method of claim 9 wherein the PCM audio signal comprises plural channels of PCM audio signals; and wherein the step of time division multiplexing comprises positioning each channel at a respective time location relative to the timebase converted video signal.

11. The method of claim 10 wherein each channel of PCM audio signals is positioned ahead of the timebase converted video signal.

12. The method of claim 10 wherein at least one channel of PCM audio signals is positioned ahead of the timebase converted video signal and at least another channel of PCM audio signals is positioned after the timebase converted video signal.

13. The method of claim 10 wherein at least one channel of PCM audio signals is comprised of left (L) and right (R) audio components.

14. The method of claim 9 wherein the step of recording comprises encoding the PCM audio signal such that its shortest recording wavelength is longer than the shortest recording wavelength of the video signal.

15. The method of claim 1 wherein the video signal exhibits a frame repetition rate and wherein the step of recording comprises supplying the time division multiplexed signals to recording heads, and rotating said recording heads across said magnetic tape at a rotation rate twice the frame repetition rate of said video signals.

16. The method of claim 9 wherein each track includes a plurality of video signal horizontal periods recorded therein; and wherein the step of timebase converting comprises timebase compressing said plurality of video signal horizontal periods to reduce an angular extent occupied in a track by the recorded video signal and timebase compressing said PCM audio signal to reduce the angular extent occupied in a track by the recorded PCM audio signal.

17. The method of claim 16 wherein the step of time division multiplexing includes the step of positioning the timebase compressed PCM audio signal ahead of the timebase compressed video signal and separated therefrom by said guard band.

18. A method of recording video and information signals in slant tracks on a magnetic tape having a wrap angle of no more than about 180°, comprising the steps of:

timebase compressing the video signal to be recorded in a track;

time division multiplexing the timebase compressed video signal and the information signal such that a guard band is formed to separate the multiplexed signals;

supplying the multiplexed signals to plural recording heads angularly separated by $\Theta$ for substantially simultaneously recording plural tracks, wherein the multiplexed signals supplied to one of said plural recording heads is delayed by an amount $\tau$ corresponding to $\Theta$ and wherein the guard band is recorded in an angular extent $\Theta_{AV}$ of a track, where $\Theta_{AV} \geq \Theta$; and recording the multiplexed signals in the plural tracks substantially simultaneously to align positions of the video and information sections of the simultaneously scanned plural tracks with each other and to position the multiplexed signals in one track relative to the multiplexed signals in an adjacent track such that if an information signals is to be recorded in said adjacent track at a later time during which a video signal in said one track is reproduced, the video signal recorded in said one track is not scanned concurrently with the scanning of the information signal recorded in said adjacent track so that said video signal is not reproduced from said one track concurrently with the recording of said information signal in said adjacent track.

19. The method of claim 18 wherein the step of recording includes supplying the time division multiplexed signals to plural recording heads angularly separated by $\Theta$, recording the timebase compressed video signal in a length of track corresponding to $\Theta_V$, recording the information signal in a length of track corresponding to $\Theta_A$, and recording the guard band for separating the timebase compressed video and information signals in a length of track corresponding to $\Theta_{AV}$, wherein $$\Theta_V + \Theta_A + \Theta_{AV} \leq 180° - \Theta.$$

20. The method of claim 19 wherein said information signal is a PCM audio signal.

21. The method of claim 20 wherein said PCM audio signal is recorded in a track ahead of said timebase compressed video signal.

22. The method of claim 20 wherein said PCM audio signal is comprised of a first segment recorded in a track ahead of said timebase compressed video signal and a second segment recorded in a track after said timebase compressed video signal.

23. The method of claim 22 wherein each segment of said PCM audio signal is comprised of plural channels of audio information.

24. The method of claim 20, further comprising the step of timebase compressing an audio signal to form a timebase compressed PCM audio signal for multiplexing with said timebase compressed video signal.

25. The method of claim 18 wherein the video signal comprises a line sequential color video signal.

26. The method of claim 25 wherein the line sequential color video signal includes a first channel of alternating line intervals and a second channel of remaining line intervals, said first channel including alternating line intervals of a first color component and said second channel including remaining line intervals of a second color component; and further comprising the step of timebase expanding the line intervals of both channels to approximately twice a line interval duration, the timebase expanded line interval in a channel being time base compressed for multiplexing with the information signal.

27. The method of claim 26 wherein plural timebase expanded line intervals are recorded in a track, having a length of track and the step of timebase compressing compresses said plural line intervals to reduce the length of track occupied thereby when recorded.

28. Apparatus for recording video and information signals having a frame repetition rate in video and information sections of slant tracks on a magnetic tape having a wrap angle of no more than about 180°, wherein plural tracks are scanned simultaneously to record signals in locations in said plural tracks, said apparatus comprising:
converting means for timebase converting at least the video signal;
multiplexing means for time division multiplexing the timebase converted video signals and the information signal, providing a guard band therebetween;
supplying the time division multiplexed signals to plural recording heads angularly separated by $\Theta$ for substantially simultaneously recording the plural tracks, wherein the time division multiplexed signals supplied to one of said plural recording heads is delayed by an amount $\tau$ corresponding to $\Theta$ and wherein the guard band is recorded in an angular extent $\Theta_{AV}$ of a track, where $\Theta_{AV} \geq \Theta$; and
recording means for scanning said magnetic tape and for recording the time division multiplexed signals sequentially in a length of track less than said wrap angle to align positions of the video and information sections of the simultaneously scanned plural tracks with each other and to position the multiplexed signals in adjacent tracks relative to each other such that when said adjacent tracks are subsequently scanned simultaneously to reproduce a previously recorded timebase converted video signal from one track and to record a new information signal in an adjacent track, the information section in said adjacent track is located at a position sufficiently shifted from the video section in said one track so that such reproducing and recording do not occur concurrently.

29. The apparatus of claim 28 wherein the recording means records a plurality of video signal horizontal periods in each track, and wherein the converting means comprises timebase compressing means for timebase compressing said plurality of horizontal periods.

30. The apparatus of claim 29 wherein the converting means further comprises analog-to-digital means for digitizing each video signal line interval, timebase expanding means for timebase expanding the digitized line intervals, and separating means for separating the timebase expanded line intervals into respective channels and for applying the respective channels to said timebase compressing means, each channel comprising a plurality of timebase expanded line intervals.

31. The apparatus of claim 30 wherein the video signal includes luminance and chrominance components; wherein the timebase expanding means comprises means for timebase expanding the digitized line intervals of the luminance component to a horizontal period greater than that of a line interval; and wherein the timebase compressing means includes means for timebase compressing the chrominance component in each line interval, and combining means for combining the timebase-expanded luminance component and the timebase-compressed chrominance component to form a timebase-expanded digitized video signal line interval.

32. The apparatus of claim 31 wherein the chrominance component comprises color difference signals, and the combining means comprises means for combining line sequential, timebase-compressed color difference signals with the timebase-expanded luminance component; and further wherein the separating means comprises means for separating the combined signals into two channels comprised of alternate timebase-expanded line intervals of the luminance component and alternate, mutually exclusive timebase-compressed line intervals of the color difference signals.

33. The apparatus of claim 29 wherein the converting means includes means for timebase compressing the information signal and for applying the timebase compressed information signal to said multiplexing means to be time division multiplexed with the timebase converted video signal.

34. The apparatus of claim 33 wherein the multiplexing means comprises means for positioning the timebase-compressed information signal ahead of the timebase converted video signal.

35. The apparatus of claim 33 wherein the multiplexing means comprises means for positioning a first portion of the timebase-compressed information signal ahead of the timebase converted video signal and for positioning a second portion of the timebase-compressed information signal after the timebase converted video signal.

36. The apparatus of claim 33 wherein the information signal is a PCM audio signal.

37. The apparatus of claim 36 wherein the PCM audio signal comprises plural channels of PCM audio signals; and wherein the multiplexing means comprises means for positioning each timebase-compressed channel at a respective time location relative to the timebase converted video, signal.

38. The apparatus of claim 37 wherein said means for positioning operates to position each channel of timebase-compressed PCM audio signals ahead of the timebase converted video signal.

39. The apparatus of claim 37 wherein said means for positioning operates to position at least one channel of timebase-compressed PCM audio signals ahead of the timebase converted video signal and to position at least another channel of timebase-compressed PCM audio signals after the timebase converted video signal.

40. The apparatus of claim 37 wherein at least one channel of PCM audio signals is comprised of left (L) and right (R) audio components.

41. The apparatus of claim 36 wherein the recording means comprises encoding means for encoding the PCM audio signal such that its shortest recording wavelength is longer than the shortest recording wavelength of the video signals.

42. The apparatus of claim 28 wherein the recording means comprises plural recording heads, and means for rotating said plural recording heads across said magnetic tape at a rotation rate twice the frame repetition rate of said video signal.

43. The apparatus of claim 41 wherein the recording means records a plurality of video signal horizontal periods in each track; and wherein the converting means comprises timebase compressing means for timebase compressing said plurality of video signal horizontal periods to reduce an angular extent occupied in a track by the recorded video signal and for timebase compressing said PCM audio signal to reduce the angular extent occupied in a track by the recorded PCM audio signal.

44. The apparatus of claim 43 wherein the multiplexing means includes means for positioning the timebase compressed PCM audio signal ahead of the timebase compressed video signal and separated therefrom by said guard band.

45. Apparatus for recording video and information signals in slant tracks on a magnetic tape having a wrap angle of no more than about 180°, comprising:
    timebase compressing means for timebase compressing the video signal to be recorded in a track;
    multiplexing means for time division multiplexing the timebase compressed video signal and the information signal such that a guard band is formed to separate the multiplexed signals;
    supplying the time division multiplexed signals to plural recording heads angularly separated by $\Theta$ for substantially simultaneously recording plural tracks, wherein the time division multiplexed signals supplied to one of said plural recording heads is delayed by an amount $\tau$ corresponding to $\Theta$ and wherein the guard band is recorded in an angular extend $\Theta_{AV}$ of a track, where $\Theta_{AV} \geq \Theta$; and
    recording means for recording the multiplexed signals in plural tracks substantially simultaneously to align the positions of the video and information sections of the simultaneously recorded adjacent tracks with each other and to position the multiplexed signals in one track relative to the multiplexed signals in an adjacent track such that if an information signal is to be recorded in said adjacent track at a later time during which a video signal in said one track is reproduced, the video signal recorded in said one track is not scanned concurrently with the scanning of the information signal recorded int he adjacent track so that said video signal is not reproduced from said one track concurrently with the recording of said information signal in said adjacent track.

46. The apparatus of claim 45 wherein the means for recording plural tracks includes a head assembly comprised of plural recording heads angularly separated by $\Theta$ for recording the timebase compressed video signal in a length of track corresponding to $\Theta_V$, the information signal in a length of track corresponding to $\Theta_A$, and the guard band for separating the timebase compressed video and information signals in a length of track corresponding to $\Theta_{AV}$, wherein $$\Theta_V + \Theta_A + \Theta_{AV} \leq 180° - \Theta.$$

47. The apparatus of claim 46 wherein said information signal is a PCM audio signal.

48. The apparatus of claim 47 wherein the recording means records said PCM audio signal in a track ahead of said timebase compressed video signal.

49. The apparatus of claim 47 wherein said PCM audio signal is comprised of first and second segments, and the recording means records said first segment in a track ahead of said timebase compressed video signal and a second segment in a track after said timebase compressed video signal.

50. The apparatus of claim 49 wherein each segment of said PCM audio signal is comprised of plural channels of audio information.

51. The apparatus of claim 47 wherein said compressing means includes means for timebase compressing an audio signal to form a timebase compressed PCM audio signal and for supplying the timebase compressed PCM audio signal to said multiplexing means.

52. The apparatus of claim 45 wherein the video signal comprises a line sequential color video signal.

53. The apparatus of claim 52 wherein the line sequential color video signal includes a first channel of alternating line intervals and a second channel of remaining line intervals, said first channel including alternating line intervals of a first color component and said second channel including remaining line intervals of a second color component; and further comprising means for timebase expanding the line intervals of both channels to approximately twice a line interval duration, and means for supplying the timebase expanded line interval in a channel to said compressing means and thence to said multiplexing means for time division multiplexing with the information signals.

54. The apparatus of claim 53 wherein the recording means records plural timebase expanded line intervals in a track, and said compressing means compresses said plural line intervals to reduce the length of track occupied thereby when recorded.

* * * * *